(12) United States Patent
Stratton et al.

(10) Patent No.: US 11,768,374 B1
(45) Date of Patent: Sep. 26, 2023

(54) VEHICLE INCLUDING HEAD WEARABLE DISPLAY DEVICE AND IMPERCEPTIBLE REFERENCE FIDUCIALS AND METHOD THEREFOR

(71) Applicant: Rockwell Collins, Inc., Cedar Rapids, IA (US)

(72) Inventors: Eric P. Stratton, Portland, OR (US); Christopher A. Keith, Wilsonville, OR (US); Brandon E. Wilson, Portland, OR (US); Weston J. Lahr, Sherwood, OR (US); Carlo L. Tiana, Portland, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 17/849,134

(22) Filed: Jun. 24, 2022

(51) Int. Cl.
 *G02B 27/01* (2006.01)
(52) U.S. Cl.
 CPC ....... *G02B 27/017* (2013.01); *G02B 27/0179* (2013.01); *G02B 2027/0181* (2013.01)
(58) Field of Classification Search
 CPC .......... G06F 3/012; G06F 3/011; G06F 3/013; G06F 3/0346; G06F 2203/0384; G06F 3/0308; G06F 3/1423; G02B 2027/0138; G02B 27/0172; G02B 2027/014; G02B 2027/0187; G02B 27/017; G02B 27/0093; G02B 27/0176; G02B 2027/011; G02B 2027/0178; G02B 27/0081; G02B 27/0179; G02B 27/141; G02B 27/142; G02B 27/145; G02B 27/283; G02B 27/32; G02B 5/30; G02B 5/3083; G02B 17/0605; G02B 2027/0134; H02J 50/10; H02J 7/0044; G06V 10/22; G06V 20/10; G06V 20/005; G06V 20/20; G06T 2207/30204; G06T 19/006; G06T 7/73; G06T 1/20; G06T 15/005; G06T 15/20; G06T 19/20; G06T 7/74; G06T 19/003; G06T 2219/2024; G06T 7/248
See application file for complete search history.

(56) References Cited

U.S. PATENT DOCUMENTS

| 9,355,599 | B2* | 5/2016 | Wu ...................... G09G 3/3413 |
| 10,429,927 | B1 | 10/2019 | Sharma et al. |
| 10,996,744 | B2 | 5/2021 | Larson |
| 11,036,453 | B1* | 6/2021 | Jarrett .................. G06K 7/1417 |
| 11,042,034 | B2 | 6/2021 | Sztuk et al. |

(Continued)

*Primary Examiner* — Ram A Mistry
(74) *Attorney, Agent, or Firm* — Suiter Swantz pc llo

(57) ABSTRACT

A system includes a vehicle cockpit and a processor. The vehicle cockpit includes imperceptible cockpit reference fiducials and a head wearable display (HWD) device. The imperceptible cockpit reference fiducials are imperceptible to a naked eye of a user in the vehicle cockpit. The HWD device includes a display and an optical sensor configured to: capture images of the imperceptible cockpit reference fiducials; and output optical sensor image data. The processor is configured to: receive the optical sensor image data; and based at least on the optical sensor image data, determine a position and orientation of the head wearable display device. The display is configured to display the images aligned with the field of view of the user based at least on the determined position and the determined orientation of the head wearable display device.

17 Claims, 9 Drawing Sheets

(56) References Cited

U.S. PATENT DOCUMENTS

| | | |
|---|---|---|
| 11,164,390 B2 | 11/2021 | Park et al. |
| 11,222,457 B2 | 1/2022 | Greco |
| 2015/0317838 A1* | 11/2015 | Foxlin ................ G02B 27/0093 345/633 |
| 2016/0339337 A1* | 11/2016 | Ellsworth .............. G02B 5/136 |
| 2018/0308248 A1* | 10/2018 | Hubert ................ G06V 10/245 |
| 2021/0346098 A1 | 11/2021 | Calloway et al. |

* cited by examiner

US 11,768,374 B1

VEHICLE INCLUDING HEAD WEARABLE DISPLAY DEVICE AND IMPERCEPTIBLE REFERENCE FIDUCIALS AND METHOD THEREFOR

BACKGROUND

Head tracking is used for head wearable display (HWD) devices and head up displays to maintain conformality with the real world and to also provide input for changing or blanking the display based on head pose configurations. Head tracking systems often use inertial tracking and/or optical tracking of the head and/or pose of a user. Currently, optical tracking uses either inside-out or outside-in tracking. Outside-in tracking uses an external light source to illuminate an on-head sensor. Inside-out tracking uses on-head sensors observing external targets, and typically, uses infrared (IR) illumination to meet dynamic range of the on-head sensor. Outside-in and inside-out tracking typically require precise installation and alignment of sensors and/or targets in cockpits, and likely include cockpit mapping, and such installed sensors and/or targets can be distracting to the pilot.

SUMMARY

In one aspect, embodiments of the inventive concepts disclosed herein are directed to a system. The system includes a vehicle cockpit and at least one processor. The vehicle cockpit includes cockpit reference fiducials and a head wearable display (HWD) device. Each of the cockpit reference fiducials are located at a different location within the vehicle cockpit. At least two of the cockpit reference fiducials are imperceptible cockpit reference fiducials. The imperceptible cockpit reference fiducials are imperceptible to a naked eye of a user in the vehicle cockpit. The head wearable display device is configured to be worn by the user. The HWD device includes a display configured to display images aligned with a field of view of the user and an optical sensor configured to: capture images of the imperceptible cockpit reference fiducials; and output optical sensor image data. One or more of the at least one processor is communicatively coupled to the optical sensor. One or more of the at least one processor is implemented in the HWD device. The at least one processor is configured to: receive the optical sensor image data; and based at least on the optical sensor image data, determine a position and orientation of the head wearable display device. The display is configured to display the images aligned with the field of view of the user based at least on the determined position and the determined orientation of the head wearable display device.

In a further aspect, embodiments of the inventive concepts disclosed herein are directed to a method. The method may include: providing cockpit reference fiducials in a vehicle cockpit, each of the cockpit reference fiducials located at a different location within the vehicle cockpit, wherein at least two of the cockpit reference fiducials are imperceptible cockpit reference fiducials, the imperceptible cockpit reference fiducials being imperceptible to a naked eye of a user in the vehicle cockpit; providing a head wearable display device in the vehicle cockpit, the head wearable display device configured to be worn by the user, the head wearable display device comprising: at least one optical sensor and a display; displaying, by the display, images aligned with a field of view of the user; capturing, by the at least one optical sensor, images of the imperceptible cockpit reference fiducials; outputting, by the at least one optical sensor, optical sensor image data; providing at least one processor, one or more of the at least one processor communicatively coupled to the at least one optical sensor, one or more of the at least one processor implemented in the head wearable display device; receiving, by the at least one processor, the optical sensor image data; and based at least on the optical sensor image data, determining, by the at least one processor, a position and orientation of the head wearable display device, wherein the display is configured to display the images aligned with the field of view of the user based at least on the determined position and the determined orientation of the head wearable display device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
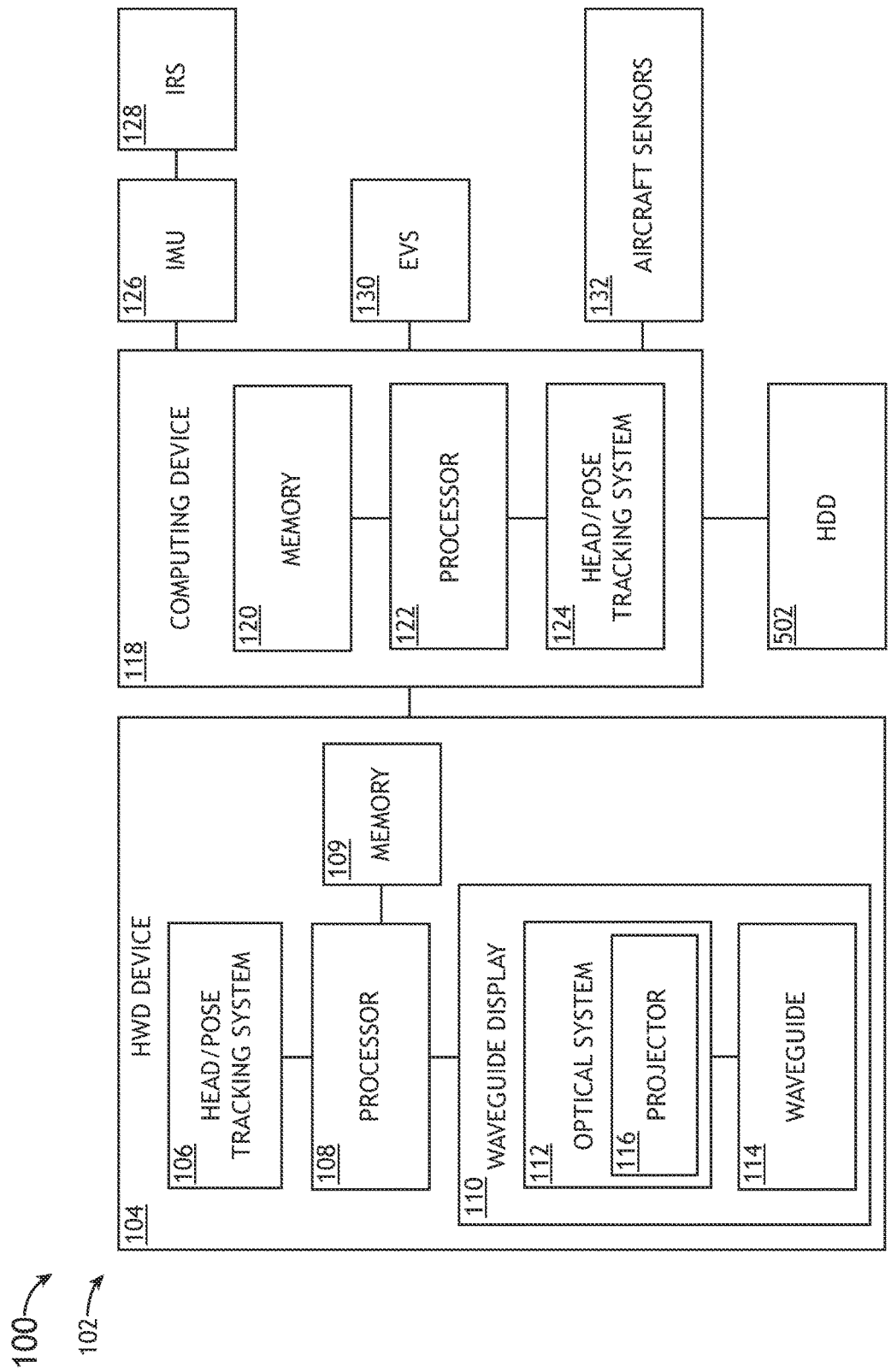
FIG. 1 is a view of an exemplary embodiment of a system including a head wearable display (HWD) device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including imperceptible reference fiducials used for head and/or pose tracking of a head wearable display (HWD) device.

Some embodiments include outside-in head and/or pose tracking objects (e.g., imperceptible reference fiducials, such as imperceptible cockpit reference fiducials) in a vehicle (e.g., aircraft) structure, wherein the imperceptible reference fiducials absorb, emit, and/or reflect ultraviolet (UV), short-wave infrared (SWIR), infrared (IR) and/or near infrared (NIR) light. For example, the imperceptible reference fiducials could be positioned at various locations within an aircraft cockpit, such as on a ceiling, on an avionics console, on an overhead switch panel, or displayed by a head-down display(s) (HDD), or the like. The imperceptible reference fiducials may be invisible to the naked eye of a user, but would be apparent and trackable by an optical sensor configured to capture light in the invisible spectrum.

Some embodiments may include interlacing (e.g., intermittently interlacing) imperceptible reference fiducials within frames displayed by at least one display (e.g., a head-down display (HDD)). In some embodiments, the imperceptible reference fiducials may include a pattern that represents a head tracking code that can indicate a specific location of the fiducial to the head and/or pose tracking system. The interlaced frames having the imperceptible reference fiducials may be synchronized with the head and/or pose tracking system (e.g., upon startup of the HWD device and/or HDD). In some embodiments, the interlaced frames having the imperceptible reference fiducials may be displayed in the visible spectrum, but be displayed so infrequently that the imperceptible reference fiducials are imperceptible to humans. In some embodiments, the frames having the imperceptible reference fiducials may be displayed in an invisible spectrum (e.g., the ultraviolet (UV), infrared (IR), short-wave infrared (SWIR), and/or near infrared (NIR) spectrum) such that the imperceptible reference fiducials are invisible to humans, but capturable by an optical sensor configured to capture light in the invisible spectrum (e.g., the ultraviolet (UV), IR, short-wave infrared (SWIR), and/or NIR spectrum). In some embodiments, the HDDs may display multiple unique patterns for the imperceptible reference fiducials to improve head and/or pose tracking accuracy.

Some embodiments including the imperceptible reference fiducials may reduce installation time and cost, reduce maintenance, and improve an aesthetic of the cockpit as compared to other fiducials, which may improve pilot and original equipment manufacturer (OEM) acceptability. Additionally, the imperceptible reference fiducials may reduce pilot distraction when looking around the cockpit.

Referring now to FIGS. 1, 2, 3, 4, 5A, 5B, 6, 7A, 7B, 7C, 7D, and 7E an exemplary embodiment of a system according to the inventive concepts disclosed herein is depicted. The system may be implemented as any suitable system, such as at least one vehicle (e.g., an aircraft 100, a spacecraft, an automobile, a watercraft, a submarine, or a train). For example, as shown in FIG. 1, the system may include an aircraft 100. For example, the vehicle (e.g., the aircraft 100 or automobile) may include a cockpit (e.g., an aircraft cockpit 102 or an automobile cockpit). For example, aircraft 100 and/or the aircraft cockpit 102 may include at least one HWD device 104, at least one computing device 118, at least one inertial measurement unit (IMU) 126, at least one inertial reference system (IRS) 128, at least one enhanced vision system (EVS) 130, at least one HDD 502, and/or aircraft sensors 132, some or all of which may be communicatively coupled at any given time.

In some embodiments, the HWD device 104 may include at least one head and/or pose tracking system 106, at least one processor 108, at least one memory 109, and/or at least one display (e.g., at least one waveguide display 110, at least one light emitting diode (LED) display, and/or at least one liquid crystal display (LCD)), some or all of which may be optically and/or communicatively coupled at any given time. For example, the waveguide display 110 may include at least one optical system 112, and/or at least one waveguide 114, some or all of which may be optically and/or communicatively coupled at any given time. In some embodiments, the HWD device 104 may be in the aircraft cockpit 102.

Figure 2:
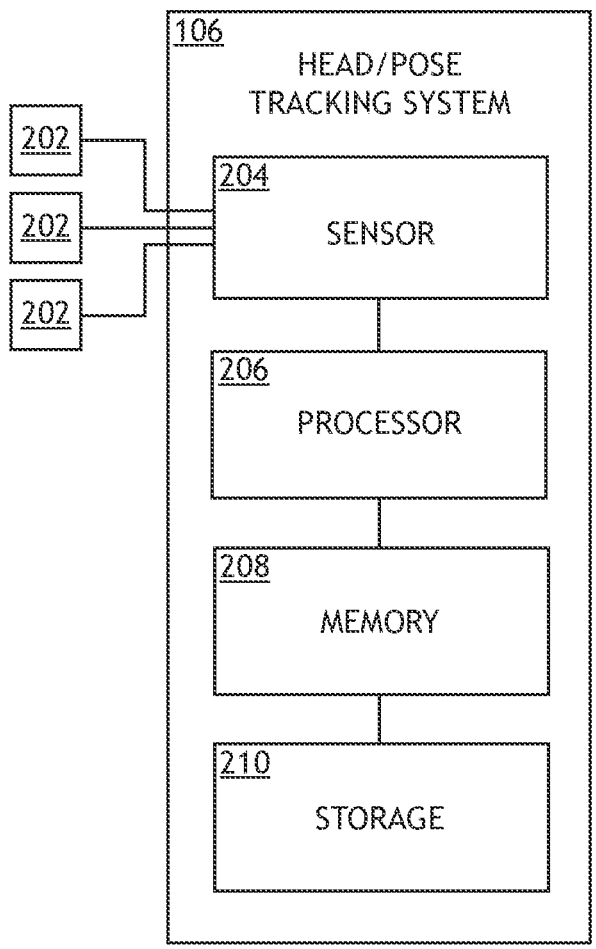
FIG. 2 is a view of the head and/or pose tracking system of the HWD device of FIG. 1 according to the inventive concepts disclosed herein.

The head and/or pose tracking system 106 may have optical, magnetic, and/or inertial tracking capability. In some embodiments, the head and/or pose tracking system 106 may include head and/or pose tracking capabilities and/or be coordinated with head and/or pose tracking capabilities of another head and/or pose tracking system (e.g., 124), for example, such that the head and/or pose tracking operations are relative to a position and/or orientation of a user and/or relative to a position and/or orientation to a vehicle (e.g., the aircraft 100). For example, the head and/or pose tracking system 106 may be configured to track a direction of where a field of view (FOV) through the waveguide display 110 is pointing. For example, if the waveguide display 110 is mounted to the HWD device 104, this direction may be a direction that a head is pointing that is being tracked. The head and/or pose tracking system 106 may include at least one sensor 204 (e.g., an UV, SWIR, IR and/or NIR camera configured to capture images of imperceptible cockpit reference fiducials 202) and/or output optical sensor image data, at least one processor 206, at least one memory 208, and/or at least one storage device 210, as well as other components, equipment, and/or devices commonly included in a head and/or pose tracking system, some or all of which may be communicatively coupled at any time, as shown in FIG. 2. The at least one processor 206 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout. The at least one sensor 204 may be at least one optical sensor (e.g., an optical UV, SWIR, IR, and/or NIR sensor (e.g., an UV, SWIR, IR, and/or NIR camera) configured to detect UV, SWIR, IR, and/or NIR light emitted and/or reflected from the imperceptible cockpit reference fiducials 202), at least one magnetic sensor, and/or at least one inertial sensor. The head and/or pose tracking system 106 may be configured to determine and track a position and an orientation of a user's head relative to an environment (e.g., a cockpit 102). The head and/or pose tracking system 106 may be configured for performing fully automatic head and/or pose tracking operations in real time. The processor 206 of the head and/or pose tracking system 106 may be configured to process data received from the sensors 204 and output processed data (e.g., head and/or pose tracking data) to one of the computing devices of the system and/or the processor 108 for use in generating images aligned with the user's field of view, such as augmented reality or virtual reality images aligned with the user's field of view to be displayed by the waveguide display 110. For example, the processor 206 may be configured to: receive the optical sensor image data; based at least on the optical sensor image data, determine a position and orientation of the head wearable display device; and/or determine and track a position and orientation of a user's head relative to an environment (e.g., a cockpit 102). Additionally, for example, the processor 206 may be configured to: generate position and orientation data associated with such determined information and output the generated position and orientation data. The processor 206 may be configured to run various software applications or computer code stored in a non-transitory computer-readable medium (e.g., memory 208 and/or storage device 210) and configured to execute various instructions or operations. In some embodiments, the at least one processor 206 may be implemented as a special purpose processor configured to execute instructions for performing (e.g., collectively performing if more than one processor) any or all of the operations disclosed throughout.

The at least one processor 108 may be implemented as any suitable processor(s), such as at least one general purpose processor, at least one central processing unit (CPU), at least one image processor, at least one graphics processing unit (GPU), and/or at least one special purpose processor configured to execute instructions for performing (e.g., collectively performing if more than one processor) any or all of the operations disclosed throughout. In some embodiments, the processor 108 may be communicatively coupled to the waveguide display 110. For example, the processor 108 may be configured to: receive head and/or pose system tracking data; receive image data from the computing device 118; generate and/or output image data to the waveguide display 110 and/or to the optical system 112, for example, based on the head and/or pose tracking system data; generate and/or output augmented reality and/or virtual reality image data to waveguide display 110 and/or the optical system 112, for example, based on the head and/or pose tracking system data; and/or generate and/or output other image data, which may include vehicle operation (e.g., aircraft) information, symbology, navigation information, tactical information, and/or sensor information to the waveguide display 110 and/or the optical system 112, for example, based on the head and/or pose tracking system data.

The waveguide display 110 may be implemented as any suitable waveguide display. For example, the waveguide display 110 may be configured to: display the images aligned with the field of view of the user based at least on the determined position and the determined orientation of the head wearable display device. The waveguide display 110 may be implemented in or on the head wearable display device 104. The waveguide display 110 may include the at least one optical system 112 and/or at least one waveguide 114. For example, the optical system 112 may include at least one processor, at least one collimator, and/or at least one projector 116. The optical system 112 may be configured to: receive image data corresponding to an image; and/or project images at least through the waveguide 114 to be displayed to the user. In some embodiments, the waveguide 116 may be a diffractive, mirror, or beam splitter based waveguide. In some embodiments, the waveguide display 111 may include at least one lens, at least one mirror, diffraction gratings, at least one polarization sensitive component, at least one beam splitter, the at least one waveguide 114, at least one light pipe, at least one window, and/or the projector 116.

The optical system 112 may be configured to receive image data from the processor 108 and project images through the waveguide 114 for display to the user.

In some embodiments, the head wearable display device 104 may include a second waveguide display 110 including a second waveguide 114 and a second optical system 112, wherein the second optical system 112 is configured to: receive the image data corresponding to the image and project the image at least through the second waveguide to be displayed to the user. In some embodiments, the waveguide display 110 is one of a left eye waveguide display or a right eye waveguide display, wherein the second waveguide display 110 is another of the left eye waveguide display or the right eye waveguide display.

The computing device 118 may be implemented as any suitable computing device, such as an avionics computing device. The computing device 118 may include at least one memory 120, at least one processor 122, and/or at least one head and/or pose tracking system 124, some or all of which may be communicatively coupled at any given time.

Figure 4:
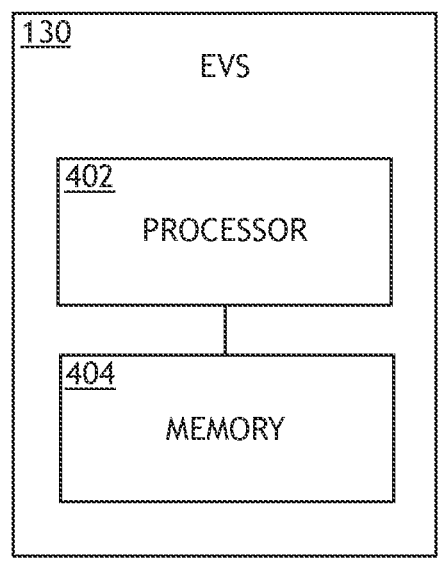
FIG. 4 is a view of the enhanced vision system of the system of FIG. 1 according to the inventive concepts disclosed herein.

The at least one processor 122 may be implemented as any suitable processor(s), such as at least one general purpose processor, at least one central processing unit (CPU), at least one FPGA, at least one image processor, at least one graphics processing unit (GPU), and/or at least one special purpose processor configured to execute instructions for performing (e.g., collectively performing if more than one processor) any or all of the operations disclosed throughout. For example, the processor 122 may be configured to: receive IMU data from the IMU 126 and/or IRS data from the IRS 128; receive EVS image data from the EVS 130 (which may include at least one processor 402 and at least one memory 404 as shown in FIG. 4); and/or receive aircraft sensor data from the aircraft sensors 132; receive head and/or pose system tracking data; generate and/or output image data to the waveguide display 110 and/or to the optical system 112, for example, based on the head and/or pose tracking system data; generate and/or output augmented reality and/or virtual reality image data to waveguide display 110 and/or the optical system 112, for example, based on and/or the head and/or pose tracking system data; and/or generate and/or output other image data, which may include vehicle operation (e.g., aircraft) information, symbology, navigation information, tactical information, and/or sensor information to the waveguide display 110 and/or the optical system 112, for example, based on the head and/or pose tracking system data.

Figure 3:
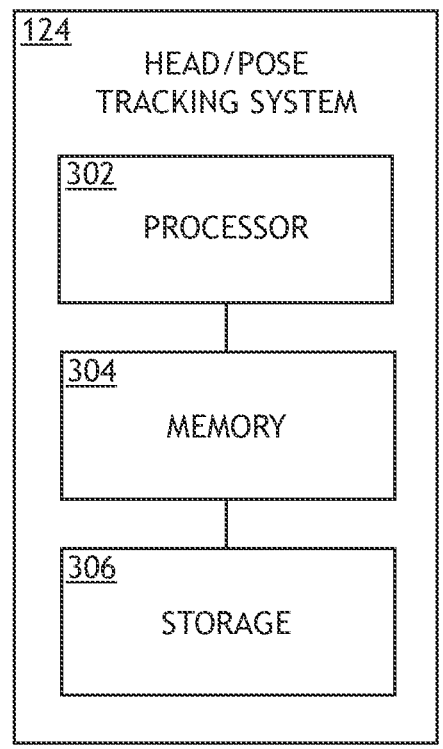
FIG. 3 is a view of the head and/or pose tracking system of the computing device of FIG. 1 according to the inventive concepts disclosed herein.

The head and/or pose tracking system 124 may have optical, magnetic, and/or inertial tracking capability. In some embodiments, the head and/or pose tracking system 124 may include head and/or pose tracking capabilities and/or be coordinated with head and/or pose tracking capabilities of another head and/or pose tracking system (e.g., 106), for example, such that the head and/or pose tracking operations are relative to a position and/or orientation of a user and/or relative to a position and/or orientation to a vehicle (e.g., the aircraft 100). For example, the head and/or pose tracking system 124 may be configured to track a direction of where a field of view (FOV) through the waveguide display 110 is pointing. For example, if the waveguide display 110 is mounted to the HWD device 104, this direction may be a direction that a head is pointing that is being tracked. The head and/or pose tracking system 106 may include at least one sensor (not shown), at least one processor 302, at least one memory 306, and/or at least one storage device 308, as well as other components, equipment, and/or devices commonly included in a head and/or pose tracking system, some or all of which may be communicatively coupled at any time, as shown in FIG. 3. The at least one processor 302 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout. The at least one sensor may be at least one optical sensor (e.g., an optical UV, SWIR, IR, and/or NIR sensor (e.g., an UV, SWIR, IR, and/or NIR camera) configured to detect UV, SWIR, IR, and/or NIR light emitted and/or reflected from the fiducials 202), at least one magnetic sensor, and/or at least one inertial sensor. The head and/or pose tracking system 124 may be configured to determine and track a position and an orientation of a user's head relative to an environment (e.g., a cockpit 102). The head and/or pose tracking system 124 may be configured for performing fully automatic head and/or pose tracking operations in real time. The processor 302 of the head and/or pose tracking system 124 may be configured to process data received from the sensors 204 and output processed data (e.g., head and/or pose tracking data) to one of the computing devices of the system and/or the at least one processor (e.g., 108, 206, and/or 122) for use in generating images aligned with the user's field of view, such as augmented reality or virtual reality images aligned with the user's field of view to be displayed by the waveguide display 110. For example, the processor 302 may be configured to: determine and track a position and orientation of a user's head relative to an environment (e.g., a cockpit 102). The processor 302 may be configured to receive IMU data from the IMU 126 and/or IRS data from the IRS 128. Additionally, for example, the processor 302 may be configured to generate position and orientation data associated with such determined information and output the generated position and orientation data. The processor 302 may be configured to run various software applications or computer code stored in a non-transitory computer-readable medium (e.g., memory 304 and/or storage device 306) and configured to execute various instructions or operations. In some embodiments, the at least one processor 302 may be implemented as a special purpose processor configured to execute instructions for performing (e.g., collectively performing if more than one processor) any or all of the operations disclosed throughout.

In some embodiments, at least one processor (e.g., 108 and/or 122), each of the at least one processor (e.g., at least one processor 108, at least one processor 206, at least one processor 302, and/or at least one processor 122) implemented in the head wearable display device 104 or in a computing device 118 separate from the head wearable display device 104, wherein the at least one processor (e.g., 108 and/or 122) is configured to perform (e.g., collectively configured to perform, if more than one processor) any of the operations disclosed throughout. For example, the at least one processor may be at least four processors including at least one head wearable display device processor 108, at least one at least one computing device processor 122, at least one head and/or pose tracking system processor 206, and/or at least one head and/or pose tracking system processor 302 collectively configured to perform any or all of the operations disclosed throughout.

Figure 5A:
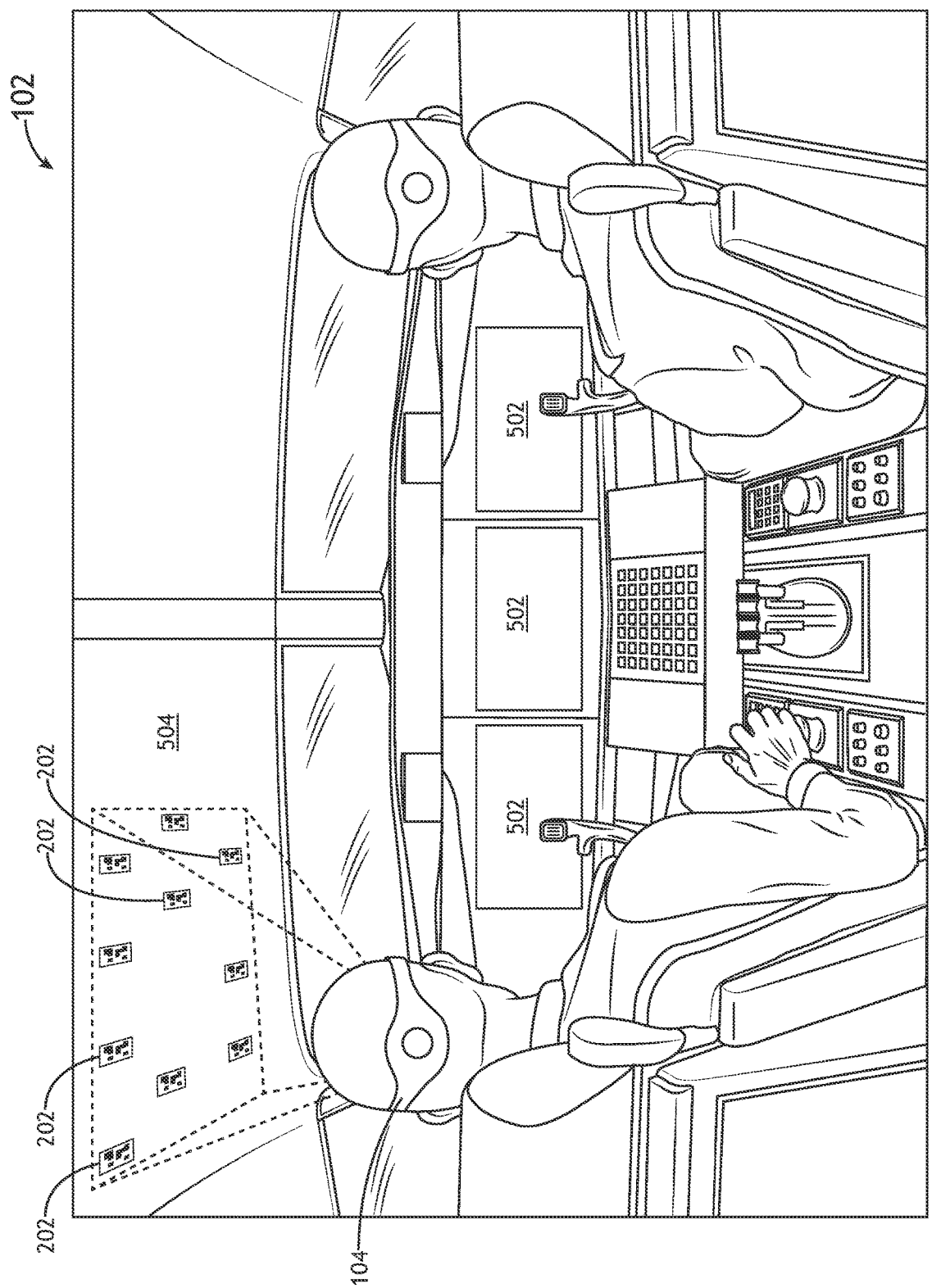
FIG. 5A is a view of an exemplary embodiment of the aircraft cockpit of FIG. 1 according to the inventive concepts disclosed herein.
Figure 5B:
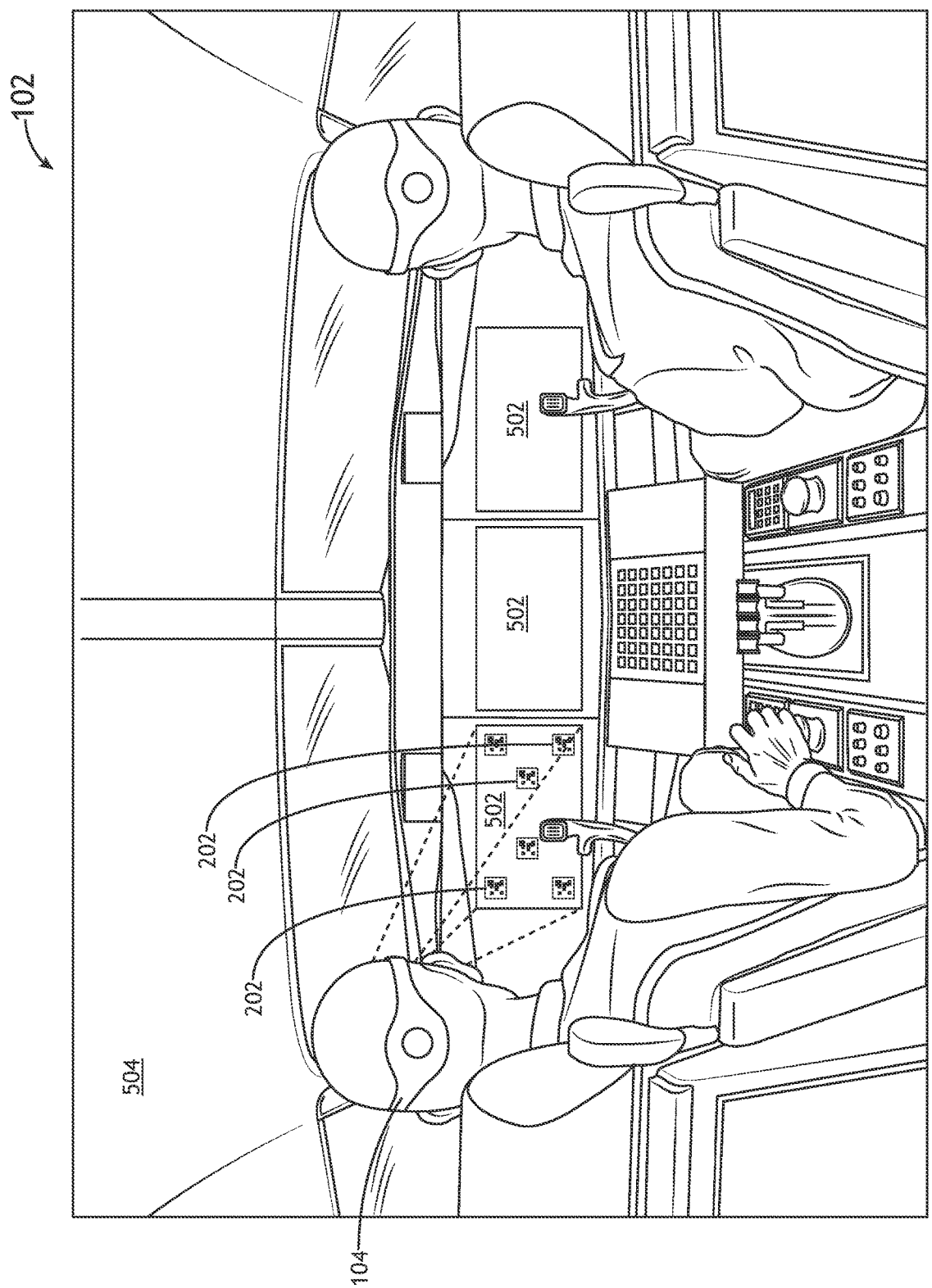
FIG. 5B is a view of an exemplary embodiment of the aircraft cockpit of FIG. 1 according to the inventive concepts disclosed herein.

As shown in FIGS. 2, 5A, and 5B, each of the cockpit reference fiducials (e.g., imperceptible cockpit reference fiducials 202) may be located at a different location within the vehicle cockpit (e.g., aircraft cockpit 102). At least two of the cockpit reference fiducials may be imperceptible cockpit reference fiducials 202. The imperceptible cockpit reference fiducials 202 may be imperceptible to a naked eye of a user in the vehicle cockpit (e.g., aircraft cockpit 102).

For example, as shown in FIG. 5A some or all of the imperceptible cockpit reference fiducials 202 may be located on structures (e.g., ceiling 504, on at least one avionics console, at least one HDD 502, and/or on at least one overhead switch panel) within the aircraft cockpit 102.

For example, as shown in FIG. 5B some or all of the imperceptible cockpit reference fiducials 202 may be imperceptible HDD cockpit reference fiducials displayed by the at least one HDD 502. The at least one HDD 502 may be configured to imperceptibly display the at least one imperceptible HDD cockpit reference fiducial.

For example, the at least one HDD 502 may be configured to imperceptibly display the at least one imperceptible HDD cockpit reference fiducial by intermittently displaying a frame of the at least one imperceptible HDD cockpit reference fiducial. For example, the at least one imperceptible HDD cockpit reference fiducial may be displayed within a visible spectrum of light and/or within an invisible spectrum (e.g., the ultraviolet (UV), IR, short-wave infrared (SWIR), and/or NIR spectrum).

For example, the at least one HDD 502 may be configured to imperceptibly display the at least one imperceptible HDD cockpit reference fiducial by displaying the at least one imperceptible HDD cockpit reference fiducial within an invisible spectrum (e.g., the ultraviolet (UV), IR, short-wave infrared (SWIR), and/or NIR spectrum). For example, the at least one optical sensor 204 may be configured to: capture the images of the at least one imperceptible HDD cockpit reference fiducial within the invisible spectrum (e.g., the ultraviolet (UV), IR, short-wave infrared (SWIR), and/or NIR spectrum). For example, the imperceptible cockpit reference fiducials 202 may further comprise at least one imperceptible coating cockpit reference fiducial applied to a surface (e.g., the ceiling 504) of the vehicle cockpit, wherein the at least one imperceptible coating cockpit reference fiducial is configured to reflect and/or emit light in the invisible spectrum (e.g., the ultraviolet (UV), IR, short-wave infrared (SWIR), and/or NIR spectrum).

In some embodiments, the imperceptible cockpit reference fiducials 202 may include at least one imperceptible coating cockpit reference fiducial applied to a surface (e.g., the ceiling 504) of the vehicle cockpit (e.g., aircraft cockpit 102), wherein the at least one imperceptible coating cockpit reference fiducial is configured to reflect and/or emit light in the invisible spectrum (e.g., the ultraviolet (UV), IR, short-wave infrared (SWIR), and/or NIR spectrum). For example, the at least one optical sensor 204 may be configured to: capture the images of the at least one imperceptible coating cockpit reference fiducial within the invisible spectrum (e.g., the ultraviolet (UV), IR, short-wave infrared (SWIR), and/or NIR spectrum). In some embodiments, the at least one imperceptible coating cockpit reference fiducial is a paint and is color matched to paint surrounding the at least one coating imperceptible cockpit reference fiducial. In some embodiments, the at least one imperceptible coating cockpit reference fiducial is a transparent coating.

Figure 6:
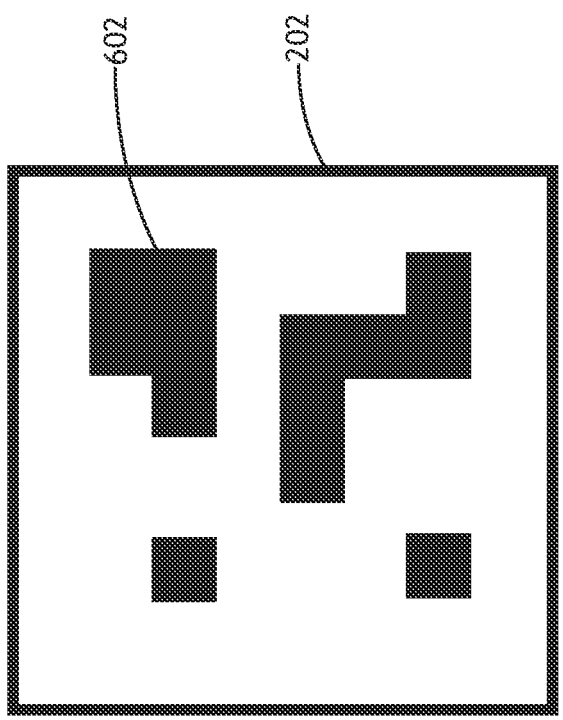
FIG. 6 is a view of an exemplary embodiment of an imperceptible cockpit reference fiducial of FIG. 2, 5A, or 5B according to the inventive concepts disclosed herein.
Figure 7A:
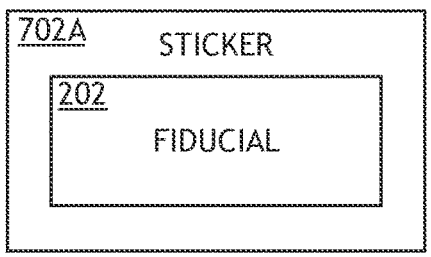
FIGS. 7A, 7B, 7C, 7D, and 7E are views of exemplary embodiments of imperceptible cockpit reference fiducials of FIG. 2 or 5A according to the inventive concepts disclosed herein.
Figure 7B:
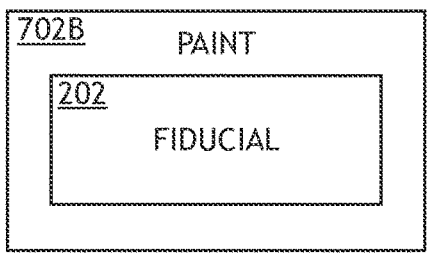
Figure 7C:
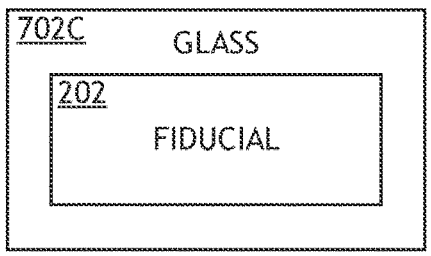
Figure 7D:
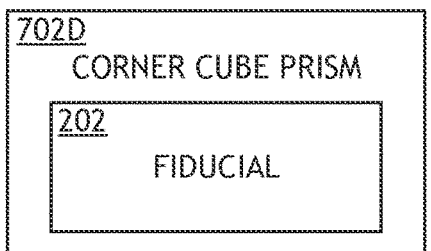
Figure 7E:
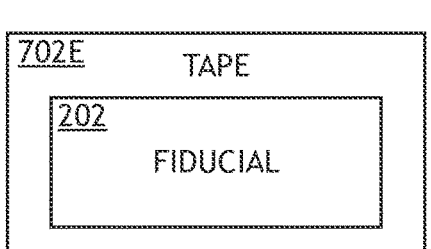

As shown in FIG. 6, each of one or more of the imperceptible cockpit reference fiducials comprises an imperceptible pattern 602 being imperceptible to the naked eye of the user in the vehicle cockpit. In some embodiments, each of the imperceptible patterns 602 may be unique among all other of the imperceptible patterns 602, wherein each of the imperceptible patterns 602 is associated with a specific location within the vehicle cockpit such that the at least one processor is configured to determine a location of a given imperceptible pattern 602 of the imperceptible patterns 602 based at least on a unique pattern of the given imperceptible pattern 602.

As shown in FIGS. 7A, 7B, 7C, 7D, and 7E, one or more of the imperceptible cockpit reference fiducials 202 may be applied to or embedded within a sticker 702A, tape 702E, paint 702B, glass 702C, and/or a corner cube prism 702D, wherein the at least one imperceptible coating cockpit reference fiducial is configured to reflect and/or emit light in the invisible spectrum (e.g., the ultraviolet (UV), IR, short-wave infrared (SWIR), and/or NIR spectrum). In some embodiments, one of ordinary skill in the art may use materials known to be transparent for visible light but reflective or absorptive in UV, IR, SWIR, and/or NIR light (e.g., for stickers, paint, glass, and/or corner cubes) to create a fiducial that is highly visible to an IR and/or NIR system but invisible or reduced visibility in the visible spectrum, such that the fiducial blends into the cockpit for a more aesthetic and less distracting (e.g., to a pilot) installation.

Figure 8:
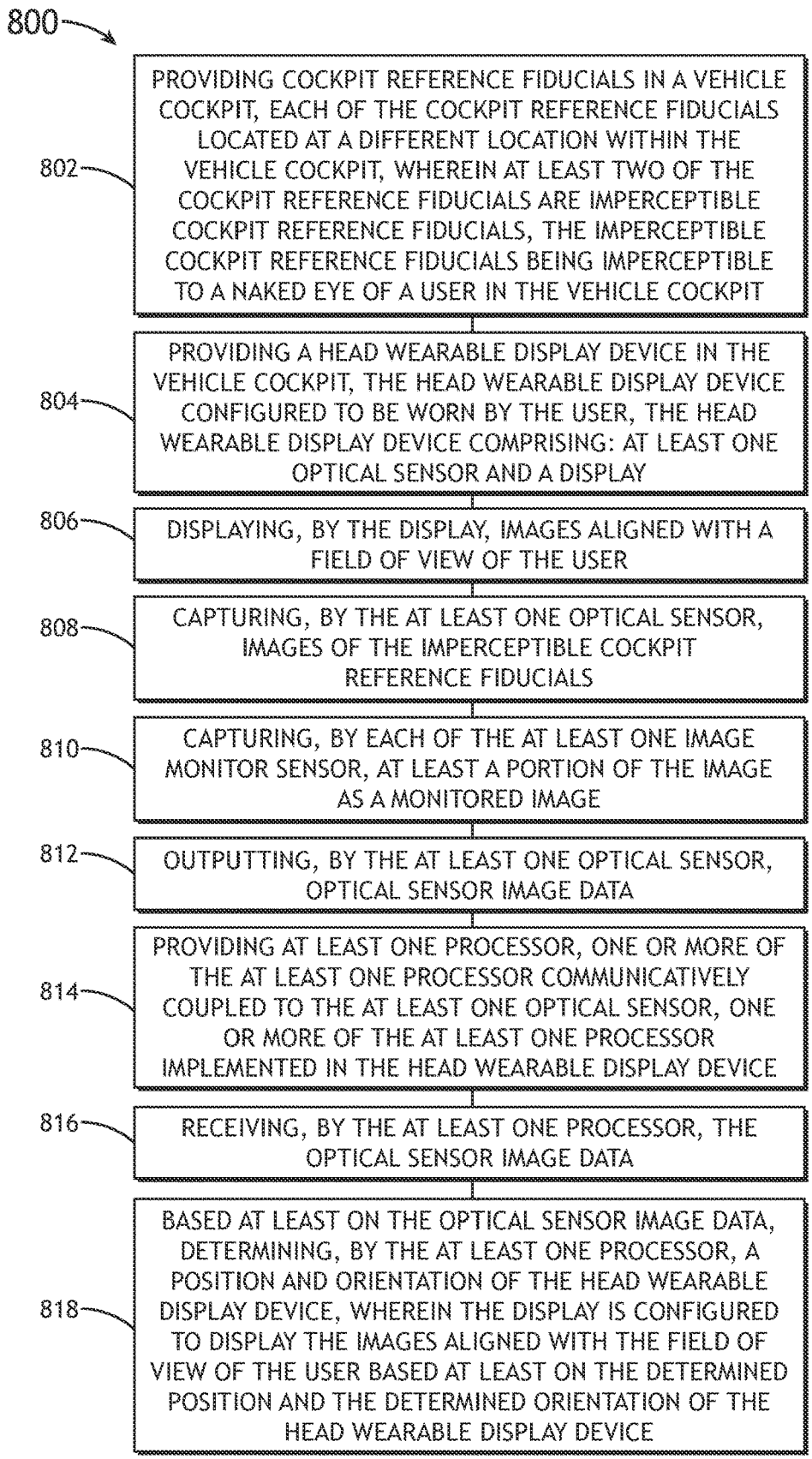
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps.

Additionally, for example, some embodiments may include performing one more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially. Additionally, in some embodiments, at least some of the steps of the method 800 may be performed in sub-steps of providing various components.

A step 802 may include providing cockpit reference fiducials in a vehicle cockpit, each of the cockpit reference fiducials located at a different location within the vehicle cockpit, wherein at least two of the cockpit reference fiducials are imperceptible cockpit reference fiducials, the imperceptible cockpit reference fiducials being imperceptible to a naked eye of a user in the vehicle cockpit.

A step 804 may include providing a head wearable display device in the vehicle cockpit, the head wearable display device configured to be worn by the user, the head wearable display device comprising: at least one optical sensor and a display.

A step 806 may include displaying, by the display, images aligned with a field of view of the user.

A step 808 may include capturing, by the at least one optical sensor, images of the imperceptible cockpit reference fiducials.

A step 810 may include outputting, by the at least one optical sensor, optical sensor image data.

A step 812 may include providing at least one processor, one or more of the at least one processor communicatively coupled to the at least one optical sensor, one or more of the at least one processor implemented in the head wearable display device.

A step 814 may include receiving, by the at least one processor, the optical sensor image data.

A step 816 may include based at least on the optical sensor image data, determining, by the at least one processor, a position and orientation of the head wearable display device, wherein the display is configured to display the images aligned with the field of view of the user based at least on the determined position and the determined orientation of the head wearable display device.

A step 818 may include based at least on the monitored image data, determining, by the at least one processor, whether the waveguide display displayed the image correctly.

Further, the method 800 may include any of the operations disclosed throughout.

As will be appreciated from the above, embodiments of the inventive concepts disclosed herein may be directed to a method and a system including imperceptible reference fiducials used for head and/or pose tracking of a head wearable display (HWD) device.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A vehicle, comprising:
   a vehicle cockpit, comprising:
   cockpit reference fiducials, each of the cockpit reference fiducials located at a different location within the vehicle cockpit, wherein at least two of the cockpit reference fiducials are imperceptible cockpit reference fiducials, the imperceptible cockpit reference fiducials being imperceptible to a naked eye of a user in the vehicle cockpit, wherein the imperceptible cockpit reference fiducials comprise at least one imperceptible coating cockpit reference fiducial applied to a surface of the vehicle cockpit, wherein the at least one imperceptible coating cockpit reference fiducial is configured to reflect light in the invisible spectrum to at least one optical sensor of a head wearable display device; and
   the head wearable display device configured to be worn by the user, the head wearable display device comprising:
   a display configured to display images aligned with a field of view of the user; and
   the at least one optical sensor configured to:
   capture images of the imperceptible cockpit reference fiducials; and
   output optical sensor image data; and
   at least one processor, one or more of the at least one processor communicatively coupled to the at least one optical sensor, one or more of the at least one processor implemented in the head wearable display device, the at least one processor configured to:
   receive the optical sensor image data; and
   based at least on the optical sensor image data, determine a position and orientation of the head wearable display device,
   wherein the display is configured to display the images aligned with the field of view of the user based at least on the determined position and the determined orientation of the head wearable display device.

2. The system of claim 1, wherein the vehicle cockpit comprises at least one head down display (HDD), wherein the imperceptible cockpit reference fiducials comprise at least one imperceptible HDD cockpit reference fiducial, wherein the at least one HDD is configured to imperceptibly display the at least one imperceptible HDD cockpit reference fiducial.

3. The system of claim 2, wherein the at least one HDD is configured to imperceptibly display the at least one imperceptible HDD cockpit reference fiducial by intermittently displaying a frame of the at least one imperceptible HDD cockpit reference fiducial.

4. The system of claim 3, wherein the at least one imperceptible HDD cockpit reference fiducial is displayed within a visible spectrum of light.

5. The system of claim 3, wherein the at least one imperceptible HDD cockpit reference fiducial is displayed within an invisible spectrum of light.

6. The system of claim 2, wherein the at least one HDD is configured to imperceptibly display the at least one imperceptible HDD cockpit reference fiducial by displaying the at least one imperceptible HDD cockpit reference fiducial within an invisible spectrum.

7. The system of claim 6, wherein the at least one optical sensor is configured to: capture the images of the at least one imperceptible HDD cockpit reference fiducial within the invisible spectrum.

8. The system of claim 1, wherein the at least one optical sensor is configured to: capture the images of the at least one imperceptible coating cockpit reference fiducial within the invisible spectrum.

9. The system of claim 8, wherein the at least one imperceptible coating cockpit reference fiducial is a paint and is color matched to paint surrounding the at least one coating imperceptible cockpit reference fiducial.

10. The system of claim 8, wherein the at least one imperceptible coating cockpit reference fiducial is a transparent coating.

11. The system of claim 1, wherein the vehicle is an aircraft, wherein the vehicle cockpit is an aircraft cockpit.

12. The system of claim 1, wherein the vehicle is an automobile, wherein the vehicle cockpit is an automobile cockpit.

13. The system of claim 1, wherein one or more of the imperceptible cockpit reference fiducials are applied to or embedded within a sticker, tape, paint, glass, or a corner cube prism.

14. The system of claim 1, wherein each of one or more of the imperceptible cockpit reference fiducials comprises an imperceptible pattern being imperceptible to the naked eye of the user in the vehicle cockpit.

15. The system of claim 1, wherein each of two or more of the imperceptible cockpit reference fiducials comprises an imperceptible pattern being imperceptible to the naked eye of the user in the vehicle cockpit, wherein each of the imperceptible patterns is unique among all other of the imperceptible patterns, wherein each of the imperceptible patterns is associated with a specific location within the vehicle cockpit such that the at least one processor is configured to determine a location of a given imperceptible pattern of the imperceptible patterns based at least on a unique pattern of the given imperceptible pattern.

16. The system of claim 1, wherein the at least one imperceptible coating cockpit reference fiducial is applied to a non-display surface of the vehicle cockpit.

17. A method for a vehicle, comprising:
- providing cockpit reference fiducials in a vehicle cockpit, each of the cockpit reference fiducials located at a different location within the vehicle cockpit, wherein at least two of the cockpit reference fiducials are imperceptible cockpit reference fiducials, the imperceptible cockpit reference fiducials being imperceptible to a naked eye of a user in the vehicle cockpit, wherein the imperceptible cockpit reference fiducials comprise at least one imperceptible coating cockpit reference fiducial applied to a surface of the vehicle cockpit, wherein the at least one imperceptible coating cockpit reference fiducial is configured to reflect light in the invisible spectrum to at least one optical sensor of a head wearable display device;
- providing the head wearable display device in the vehicle cockpit, the head wearable display device configured to be worn by the user, the head wearable display device comprising: the at least one optical sensor and a display;
- displaying, by the display, images aligned with a field of view of the user;
- capturing, by the at least one optical sensor, images of the imperceptible cockpit reference fiducials;
- outputting, by the at least one optical sensor, optical sensor image data;
- providing at least one processor, one or more of the at least one processor communicatively coupled to the at least one optical sensor, one or more of the at least one processor implemented in the head wearable display device;
- receiving, by the at least one processor, the optical sensor image data; and
- based at least on the optical sensor image data, determining, by the at least one processor, a position and orientation of the head wearable display device, wherein the display is configured to display the images aligned with the field of view of the user based at least on the determined position and the determined orientation of the head wearable display device.

* * * * *